(12) United States Patent
Morioka et al.

(10) Patent No.: US 9,110,257 B2
(45) Date of Patent: Aug. 18, 2015

(54) OPTICAL RECEPTACLE AND OPTICAL MODULE PROVIDED WITH SAME

(71) Applicant: Enplas Corporation, Saitama (JP)

(72) Inventors: Shimpei Morioka, Saitama (JP); Kazutaka Shibuya, Saitama (JE); Masahiro Tanazawa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/405,529

(22) PCT Filed: Jun. 3, 2013

(86) PCT No.: PCT/JP2013/003480
§ 371 (c)(1),
(2) Date: Dec. 4, 2014

(87) PCT Pub. No.: WO2013/183273
PCT Pub. Date: Dec. 12, 2013

(65) Prior Publication Data
US 2015/0131947 A1    May 14, 2015

(30) Foreign Application Priority Data
Jun. 5, 2012 (JP) .................................. 2012-127927

(51) Int. Cl.
*G02B 6/32* (2006.01)
*G02B 6/42* (2006.01)
*G02B 6/43* (2006.01)
*G02B 6/38* (2006.01)

(52) U.S. Cl.
CPC ............ *G02B 6/4204* (2013.01); *G02B 6/4206* (2013.01); *G02B 6/4286* (2013.01); *G02B 6/4292* (2013.01); *G02B 6/3817* (2013.01)

(58) Field of Classification Search
CPC .. G02B 6/3817; G02B 6/4204; G02B 6/4206; G02B 6/4214; G02B 6/4286
USPC ............................................................ 385/93
See application file for complete search history.

(56) References Cited

U.S. PATENT DOCUMENTS

| 6,941,047 | B2 * | 9/2005 | Capewell et al. ............... 385/47 |
| 7,349,602 | B2 * | 3/2008 | Panotopoulos ................ 385/47 |
| 2001/0000678 | A1 * | 5/2001 | Hattori et al. .................. 353/20 |
| 2004/0179784 | A1 * | 9/2004 | Vancoille et al. ............... 385/47 |
| 2005/0147353 | A1 * | 7/2005 | Vancoill et al. ................. 385/47 |
| 2006/0210225 | A1 | 9/2006 | Fujiwara et al. |
| 2008/0062524 | A1 * | 3/2008 | Song et al. .................... 359/577 |
| 2009/0196556 | A1 | 8/2009 | Fujiwara et al. |

(Continued)

FOREIGN PATENT DOCUMENTS

| JP | 2004-333590 A | 11/2004 |
| JP | 2006-520491 A | 9/2006 |

(Continued)

*Primary Examiner* — Akm Enayet Ullah
(74) *Attorney, Agent, or Firm* — Brundidge & Stanger, P.C.

(57) ABSTRACT

A surface (3*a*') having light of a light emitting element (10) inputted thereto and monitor light outputted therefrom is formed as a part of an optical plate (3), and an output surface (12) having coupling light outputted therefrom is formed as a part of an optical block (4), thereby simply and highly accurately forming the optical surfaces (3*a*', 12). Then, the optical plate (3) and the optical block (4) are simply and highly accurately combined by being fitted together by means of fitting sections (21, 25).

8 Claims, 9 Drawing Sheets

(56) References Cited

U.S. PATENT DOCUMENTS

| | | |
|---|---|---|
| 2011/0057204 A1* | 3/2011 | Morioka .................... 257/84 |
| 2012/0002284 A1* | 1/2012 | McColloch et al. ......... 359/558 |
| 2012/0219256 A1 | 8/2012 | McColloch |
| 2012/0263416 A1* | 10/2012 | Morioka .................... 385/33 |

FOREIGN PATENT DOCUMENTS

| | | |
|---|---|---|
| JP | 2011-039151 A | 2/2011 |
| JP | 2011-133807 A | 7/2011 |
| WO | 2011/077723 A1 | 6/2011 |

* cited by examiner

OPTICAL RECEPTACLE AND OPTICAL MODULE PROVIDED WITH SAME

TECHNICAL FIELD

The present invention relates to an optical receptacle and an optical module including the same. In particular, the present invention relates to an optical receptacle and an optical module including the same suitable for optically coupling a light emitting element and an optical transmission member.

BACKGROUND ART

Conventionally, in optical communications using optical fibers, an optical module such as a surface-emitting laser (for example, VCSEL: Vertical Cavity Surface Emitting Laser) having a light emitting element has been used.

In such an optical module, an optical module component called optical receptacle is used. The optical receptacle couples light including communication information emitted from a light emitting element with an end surface of an optical fiber, and thus achieves optical transmission through the optical fiber.

Conventionally, in the optical module, for the purpose of adjusting the light output or stabilizing the output characteristics of an light emitting element against temperature variation, various techniques for monitoring (observing) the light (intensity and light amount) emitted from a light emitting element have been proposed.

For example, PTL 1, which has been made by the present inventor, discloses an invention directed to an optical module including a lens array which is an example of optical receptacles. In the invention disclosed in PTL 1, laser light emitted from a light emitting element is first incident on a first lens surface, and then reflected by a reflecting surface toward an optical fiber side, and thereafter, separated into coupling light directed to the optical fiber and monitoring light by a reflection-and-transmission layer disposed in a recess of a lens array main body. Then, after sequentially passing through a prism disposed in the recess, a filler, and the lens array main body, the coupling light is output from a second lens surface toward an end surface of an optical fiber. On the other hand, after passing through the lens array main body, the monitoring light is output from a third lens surface toward a light-receiving element.

CITATION LIST

Patent Literature

PTL 1
Japanese Patent Application Laid-Open No. 2011-133807

SUMMARY OF INVENTION

Technical Problem

According to the invention disclosed in PTL 1, by utilizing reflection and transmission at a reflection-and-transmission layer, the monitoring light can be simply and surely obtained while appropriately ensuring the light path of the coupling light.

On the basis of the advantage of the invention disclosed in PTL 1, the present inventor achieved the present invention as a result of earnest research for improving the manufacturability and reliability.

An object of the present invention is to provide an optical receptacle and a light module including the optical receptacle which can improve manufacturability while ensuring optical performance by simply and highly accurately manufacturing the optical surfaces in comparison with the case where the surface on which the light of the light emitting element is incident and from which the monitoring light is output and the surface from which the coupling light is output are integrally manufactured.

Solution to Problem

The present invention relates to the optical receptacle and the optical module described below.

[1] An optical receptacle that optically couples a light emitting element and an optical transmission member together when the optical receptacle is disposed between a photoelectric conversion device and the optical transmission member, the photoelectric conversion device including the light emitting element and a light-receiving element that receives monitoring light for monitoring light output from the light emitting element, the optical receptacle including: an optical plate that is light transmissive and is so disposed as to face the photoelectric conversion device; an optical block which is light transmissive and disposed on a side opposite to the photoelectric conversion device with respect to the optical plate; and a filler which is light transmissive and provided between the optical block and the optical plate, wherein: the optical plate includes a plate exterior surface on which light from the light emitting element is incident and from which the monitoring light is output toward the light-receiving element, a plate internal surface disposed in parallel to the plate exterior surface on a side opposite to the photoelectric conversion device with respect to the plate exterior surface, the plate internal surface being a surface through which light of the light emitting element incident on the plate exterior surface and the monitoring light to be output from the plate exterior surface pass, and an optical plate fitting-part disposed on the plate internal surface, the optical plate fitting-part being configured to fit the optical plate and the optical block together, the optical block includes a plate-facing surface disposed at a position near the plate internal surface, the plate-facing surface being so disposed as to face the plate internal surface, an incidence surface disposed on the plate-facing surface, the incidence surface being a surface on which light of the light emitting element that passed through the plate internal surface is incident, a reflecting surface disposed on a side opposite to the incidence surface at a tilted angle relative to the incidence surface, the reflecting surface being configured to receive light of the light emitting element incident on the incidence surface, and to reflect the light of the light emitting element thus received toward the optical transmission member, a recess provided at a position on the optical transmission member side on the plate-facing surface in such a manner as to be recessed and to open to the plate internal surface side, the recess being a recess through which light of the light emitting element reflected by the reflecting surface passes, a reflection-and-transmission layer that is formed as an internal surface of the recess on the optical transmission member side, and is disposed on an internal tilted surface of the recess, the internal tilted surface having a predetermined tilted angle relative to the incidence surface, the reflection-and-transmission layer being configured to receive light of the light emitting element that passed through the recess, and to reflect at a predetermined reflectance the light of the light emitting element thus received toward the plate internal surface as the monitoring light while transmitting the light of the light emitting element to the optical transmission member side at a predetermined transmittance as coupling light to be coupled to the optical transmission member, an emission surface that receives the coupled light transmitted through the reflection-and-transmission layer, and outputs the coupled light thus received toward the optical transmission member, and an optical block-fitting part disposed at a position corresponding to the optical plate fitting-part on the plate-facing surface, the optical block-fitting part being configured to be fitted with the optical plate fitting-part, and the filler is provided at least in the recess, and between the recess and the plate internal surface.

[2] The optical receptacle according to [1], wherein refractive indices of the optical block and the filler are selected such that a difference between the refractive indices is equal to or smaller than a predetermined value.

[3] The optical receptacle according to [2], wherein the filler is also provided between the incidence surface and the plate internal surface, and a refractive index of the optical plate is selected such that differences in refractive index between the optical plate and the optical block and between the optical plate and the filler are each equal to or smaller than the predetermined value.

[4] The optical receptacle according to any one of [1] to [3], wherein the filler is composed of an ultraviolet ray-curable adhesive agent, and at least one of the optical plate and the optical block is formed of an ultraviolet ray-transmitting material.

[5] The optical receptacle according to any one of [1] to [4], wherein the reflecting surface is a total reflection surface on which light of the light emitting element is incident at an incident angle greater than a critical angle, and by which the light of the light emitting element incident on the total reflection surface is totally reflected toward the optical transmission member.

[6] The optical receptacle according to any one of [1] to [5], wherein a first lens surface configured to input light of the light emitting element toward the reflecting surface is disposed at a position corresponding to the light emitting element on the plate exterior surface, and the emission surface is a second lens surface.

[7] The optical receptacle according to [6], wherein a third lens surface configured to output the monitoring light toward the light-receiving element is disposed at a position corresponding to the light-receiving element on the plate exterior surface.

[8] An optical module including: the optical receptacle according to any one of [1] to [7]; and the photoelectric conversion device according to [1].

Advantageous Effects of Invention

According to the invention of [1], the plate exterior surface on which light of the light emitting element is incident and from which monitoring light is output is formed in the optical plate, and the emission surface from which coupled light is output is formed in the optical block, and thus the optical surfaces can be simply and highly accurately formed. On top of that, since the optical plate and the optical block can be simply and accurately fitted with each other by the fitting parts, the optical receptacle with sufficient dimensional accuracy can be readily manufactured.

According to the invention of [2], the light path between the reflecting surface and the emission surface can be provided along substantially the same line. Thus, in the case where deviation of the coupling position of the optical transmission member is found during the product test, the number of parts that require dimensional adjustment for eliminating the deviation can be reduced, and manufacturability can be further facilitated.

According to the invention of [3], light use efficiency can be improved by limiting Fresnel reflection on the plate internal surface and the plate-facing surface.

According to the invention of [4], by stably and efficiently fixing the optical plate and the optical block, mechanical strength and manufacturing efficiency can be improved.

According to the invention of [5], since the reflecting surface can be readily formed, the number of components and cost can be reduced.

According to the invention of [6], by forming the first lens surface and the second lens surface in the optical plate and the optical block, respectively, the lens surfaces can be simply and highly accurately formed.

According to the invention of [7], by forming the first lens surface and the third lens surface in the optical plate, and by forming the second lens surface in the optical block, the lens surfaces can be simply and highly accurately formed.

According to the invention of [8], the optical module with sufficient dimensional accuracy can be readily manufactured.

As described, according to the present invention, it is possible to improve manufacturability while ensuring optical performance by simply and highly accurately manufacturing the optical surfaces in comparison with the case where the surface on which the light of the light emitting element is incident and from which the monitoring light is output and the surface from which the coupling light is output are integrally manufactured.

DESCRIPTION OF EMBODIMENTS

In the following, an optical receptacle and an optical module according to an embodiment of the present invention will be described with reference to FIG. 1 to FIG. 9.

Figure 1:
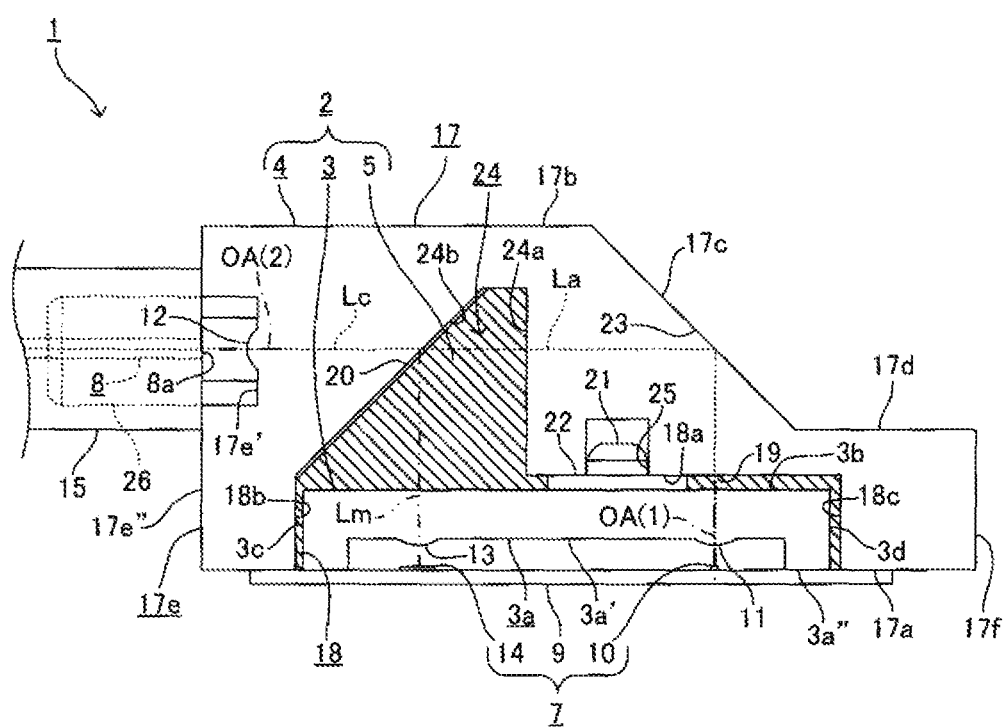
FIG. 1 is a schematic diagram that schematically illustrates a configuration of an optical module according to an embodiment of the present invention, with a longitudinal sectional view of a lens array serving as an optical receptacle according to the embodiment of the present invention.

FIG. 1 is a schematic diagram that schematically illustrates a configuration of optical module 1 of the present embodiment, with a longitudinal sectional view of lens array 2 serving as an optical receptacle of the present embodiment.

Figure 2:
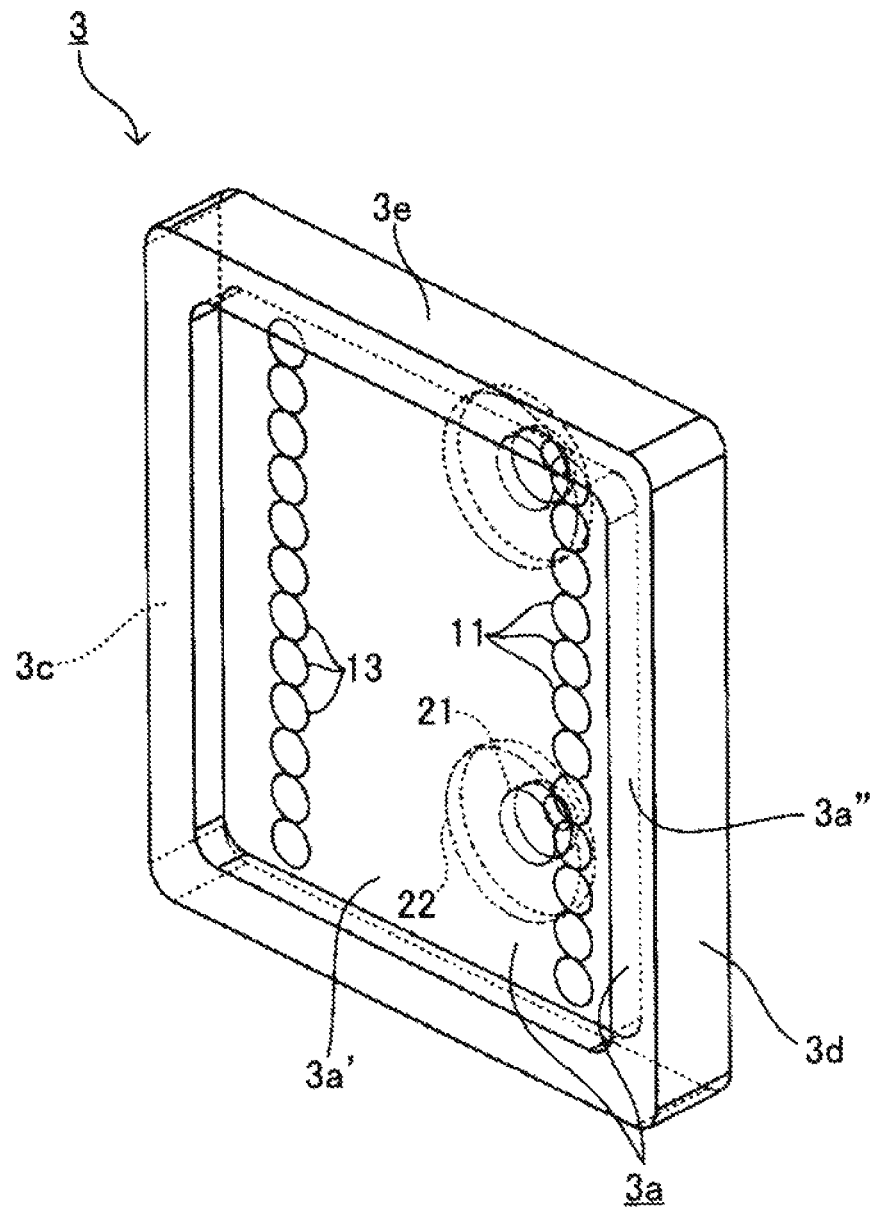
FIG. 2 is an upward perspective view of an optical plate in the lens array illustrated in FIG. 1.
Figure 3:
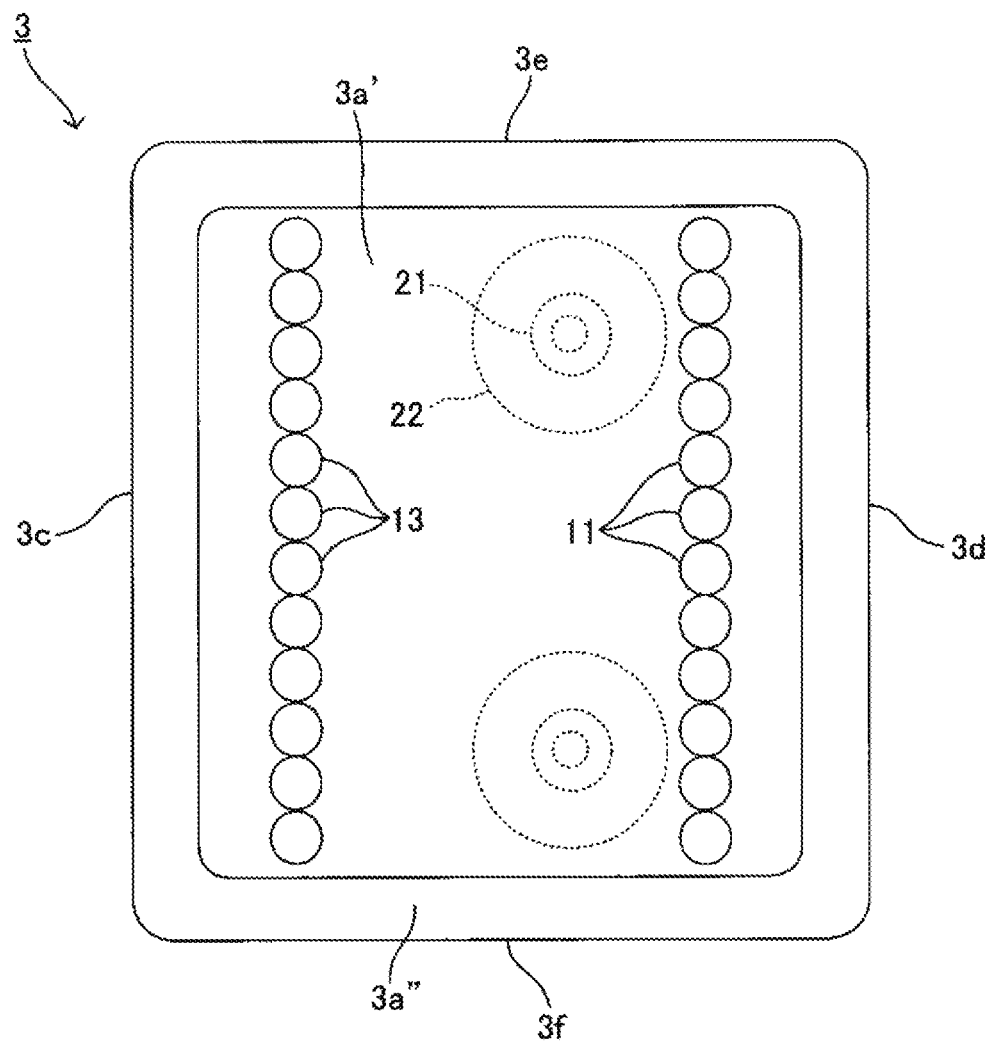
FIG. 3 is a bottom view of the optical plate.
Figure 4:
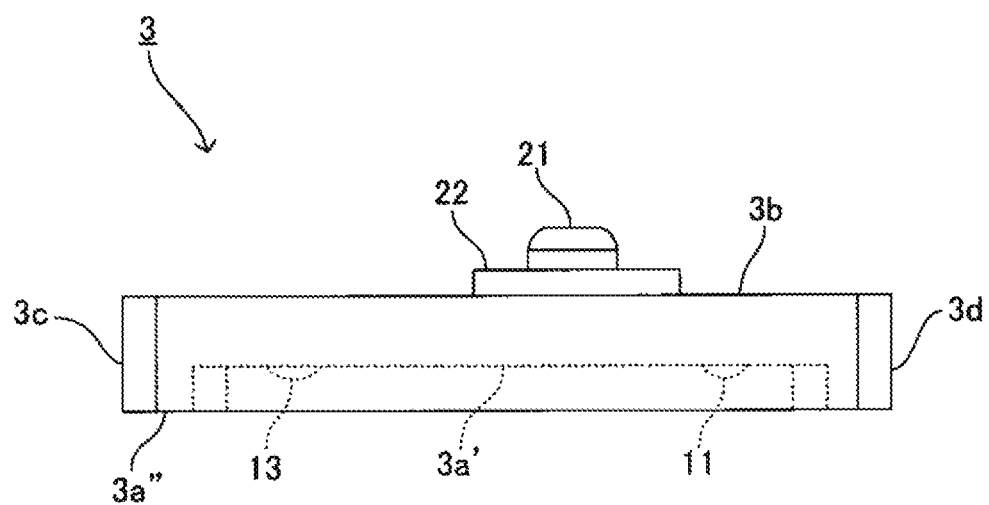
FIG. 4 is a front view of the optical plate.
Figure 5:
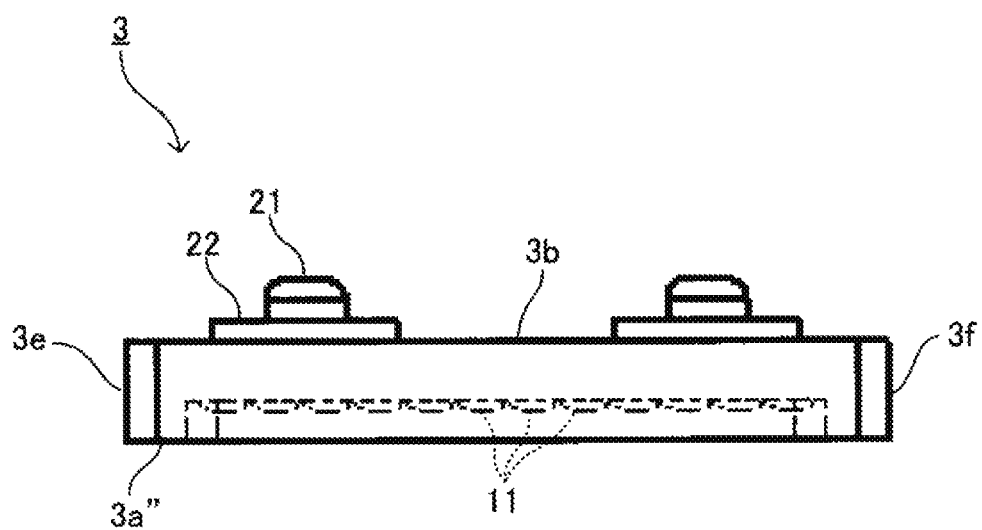
FIG. 5 is a right side view of the optical plate.

FIG. 2 to FIG. 5 illustrate optical plate 3 described later in lens array 2 illustrated in FIG. 1. To be more specific, FIG. 2 is an upward perspective view of optical plate 3, FIG. 3 is a bottom view of optical plate 3, FIG. 4 is a front view of optical plate 3, and FIG. 5 is a right side view of optical plate 3 illustrated in FIG. 4.

Figure 6:
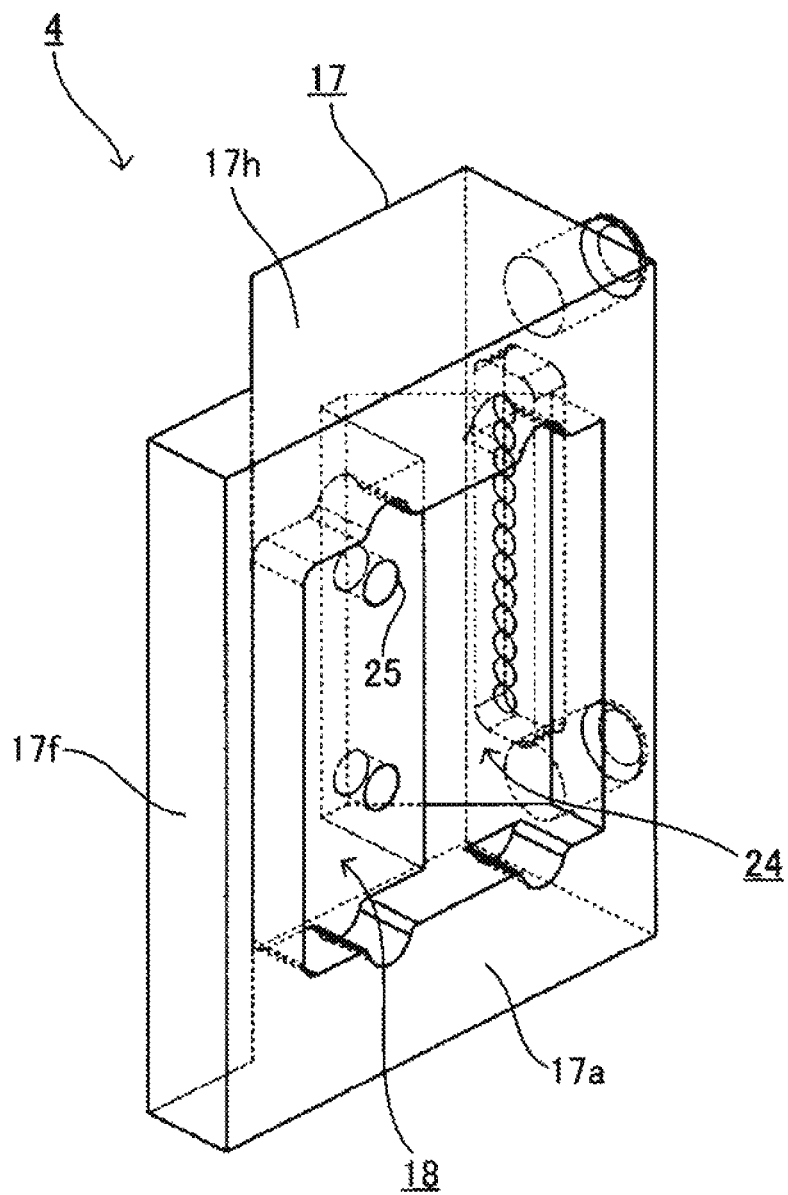
FIG. 6 is an upward perspective view of an optical block in the lens array illustrated in FIG. 1.
Figure 7:
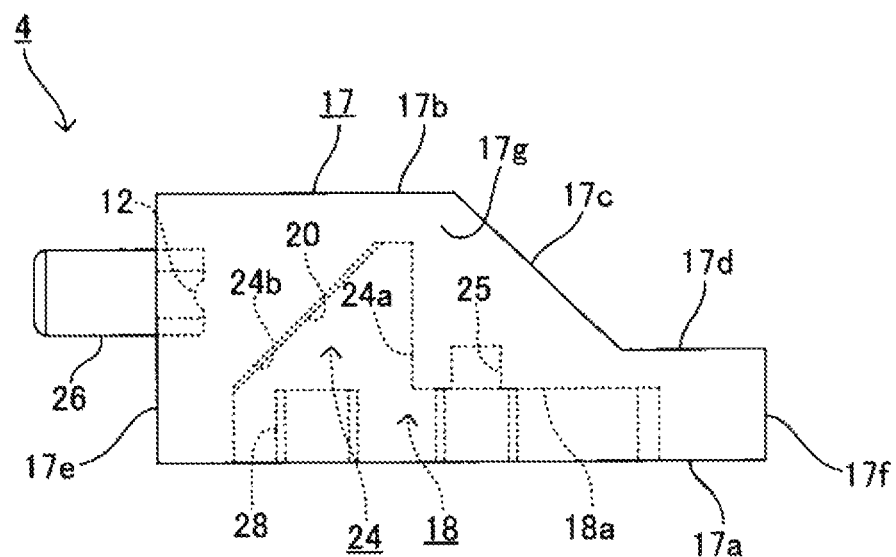
FIG. 7 is a front view of the optical block.
Figure 8:
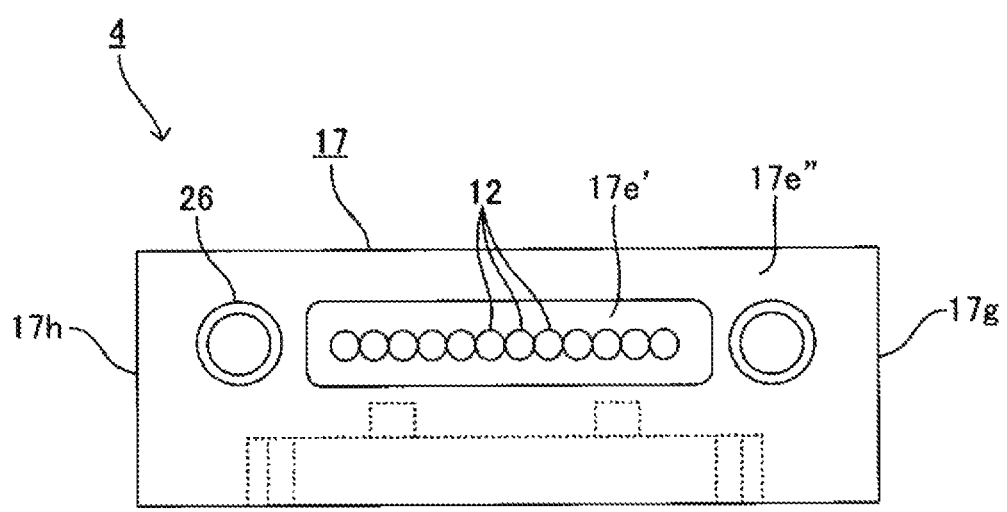
FIG. 8 is a left side view of the optical block.
Figure 9:
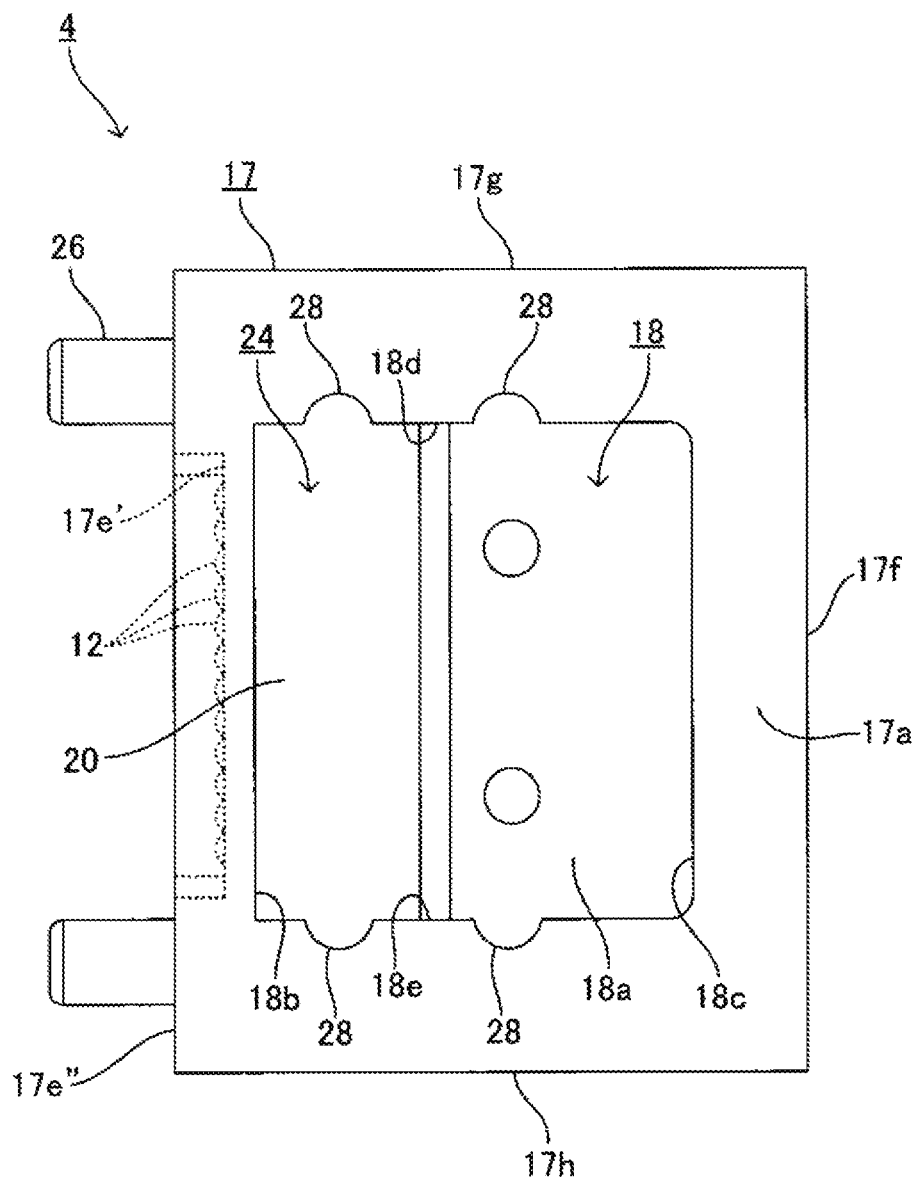
FIG. 9 is a bottom view of the optical block.

FIG. 6 to FIG. 9 illustrate optical block 4 described later in lens array 2 in FIG. 1. To be more specific, FIG. 6 is an upward perspective view of optical block 4, FIG. 7 is a front view of optical block 4, FIG. 8 is a left side view of optical block 4 illustrated in FIG. 7, and FIG. 9 is a bottom view of optical block 4 illustrated in FIG. 7.

Returning back to FIG. 1, lens array 2 of the present embodiment is disposed between photoelectric conversion device 7 and optical fiber 8 serving as an optical transmission member. In FIG. 1, photoelectric conversion device 7 is disposed below lens array 2, and optical fiber 8 is disposed on the left side of lens array 2.

[Details of Configuration of Photoelectric Conversion Device]

Photoelectric conversion device 7 includes a plurality of light emitting elements 10 disposed on a surface of semiconductor substrate 9 which faces lens array 2 (top surface in FIG. 1). Light emitting elements 10 emit (output) laser light La in a direction (in FIG. 1, upward) perpendicular to the surface of semiconductor substrate 9 which faces lens array 2. Light emitting elements 10 compose the above-described VCSEL (vertical cavity surface emitting laser). It is to be noted that, in FIG. 1, light emitting elements 10 are laid out along the depth direction in FIG. 1. In addition, photoelectric conversion device 7 includes a plurality of light-receiving elements 14 that are disposed on the surface of semiconductor substrate 9 which faces lens array 2 and on the left side relative to light emitting element 10 in FIG. 1. Light-receiving elements 14 are configured to receive monitoring light Lm for monitoring the output (for example, the intensity and the amount of light) of laser light La emitted from light emitting elements 10. The number of light-receiving elements 14 is the same as that of light emitting elements 10. It is to be noted that light-receiving elements 14 and light emitting elements 10 are aligned in the same direction, and the positions of light emitting element 10 and light-receiving element 14 corresponding to each other match in the alignment direction. That is, light-receiving elements 14 are laid out at the same pitch as that of light emitting elements 10. Light-receiving elements 14 may be photodetectors. In addition, as long as at least one light-receiving element 14 is disposed, the number of light-receiving elements 14 may not be the same as that of light emitting elements 10, and the number of light-receiving elements 14 may be smaller than that of light emitting elements 10. Further, although not shown in the drawings, photoelectric conversion device 7 is connected with a control circuit that controls the output of laser light La emitted from light emitting element 10 based on the intensity and the amount of monitoring light Lm received by light-receiving element 14. Such a photoelectric conversion device 7 is so disposed as to face lens array 2, with semiconductor substrate 9 making contact with lens array 2, for example. Photoelectric conversion device 7 is attached to lens array 2 with a generally known fixing member not illustrated in the drawings such as a clamp spring, and thus composes optical module 1 together with lens array 2, for example.

[Details of Configuration of Optical Fiber]

In addition, the number of optical fibers 8 of the present embodiment is the same as that of light emitting elements 10 and light-receiving elements 14, and optical fibers 8 are laid out at the same pitch as that of light emitting elements 10 along the depth direction in FIG. 1. Optical fibers 8 have the same size and are of a multiple mode type, for example. A portion on end surface 8a side of each optical fiber 8 is held in optical connector 15 of a multicore collective type such as an MT connector. Such an optical fiber 8 is attached to lens array 2 with a publicly known fixing member not shown in the drawings (for example, a clamp spring), with the end surface of optical connector 15 on the lens array 2 side making contact with lens array 2, for example.

Lens array 2 disposed between photoelectric conversion device 7 and optical fiber 8 having the above-mentioned configuration optically couples light emitting elements 10 and end surfaces 8a of optical fibers 8.

[Details of Configuration of Lens Array]

Now lens array 2 is further specifically described. As illustrated in FIG. 1, lens array 2 includes light-transmissive optical plate 3 that is so disposed as to face photoelectric conversion device 7, light transmissive optical block 4 disposed on the side opposite to photoelectric conversion device 7 with respect to optical plate 3 (upper side in FIG. 1), and light transmissive filler 5 provided between optical block 4 and optical plate 3.

[Details of Optical Plate]

Here, first, details of optical plate 3 are described. As illustrated in FIG. 1 to FIG. 5, optical plate 3 has an external shape of a substantially rectangular plate shape.

That is, as illustrated in FIG. 1 to FIG. 5, the external shape of optical plate 3 is roughly composed of lower surface 3a, upper surface 3b, left surface 3c, right surface 3d, front surface 3e and rear surface 3f.

Upper and lower surfaces 3a and 3b, left and right surfaces 3c and 3d, and front and rear surfaces 3e and 3f are respectively parallel to each other. In addition, upper and lower surfaces 3a and 3b are perpendicular to each of front, rear left and right surfaces 3c to 3f.

<Plate Exterior Surface>

In lower surface 3a of optical plate 3 having the above-mentioned configuration, portion 3a' having a substantially rectangular shape in plan view that occupies most of the range of the center portion in FIG. 3 is formed on a plane recessed upward relative to peripheral portion 3a" in FIG. 1. Portion 3a' is plate exterior surface 3a' on which laser light La from light emitting elements 10 is incident and from which monitoring light Lm is output toward light-receiving element 14.

<First Lens Surface>

While laser light La may be applied on plate exterior surface 3a' having the above-mentioned configuration through a plane region of plate exterior surface 3a', the present embodiment employs a configuration in which the light flux diameter of laser light La is appropriately controlled.

Specifically, as illustrated in FIG. 1 to FIG. 4, at right end portions of plate exterior surface 3a' which correspond to light emitting elements 10 in FIG. 1 to FIG. 4, first lens surfaces (convex lens surfaces) 11 each having a circular shape in plan view are formed. The number (12) of first lens surfaces 11 is the same as that of light emitting elements 10. First lens surfaces 11 are so formed as to be aligned along a predetermined direction corresponding to light emitting elements 10 (the depth direction in FIG. 1 and FIG. 4, or the vertical direction in FIG. 3). Further, first lens surfaces 11 are formed in the same size, and at the same pitch as that of light emitting elements 10. It is to be noted that first lens surfaces 11 adjacent to each other in the alignment direction may be in contact with each other at their circumferential end. Preferably, as illustrated in FIG. 1, optical axis OA (1) of each first lens surface 11 matches the central axis of laser light La emitted from light emitting element 10 corresponding to the first lens surface 11. More preferably, optical axis OA (1) of each first lens surface 11 is perpendicular to plate exterior surface 3a'.

As illustrated in FIG. 1, on each first lens surface 11 having the above-mentioned configuration, laser light La emitted from light emitting element 10 corresponding to the first lens surface 11 is incident. Each first lens surface 11 converges (refracts) laser light La (light flux having a predetermined spread angle) from light emitting element 10 while allowing laser light La to travel into optical plate 3. It is to be noted that each first lens surface 11 may collimate laser light La emitted from light emitting element 10 corresponding to the first lens surface 11, or may converge laser light La emitted from light emitting element 10 corresponding to the first lens surface 11 in such a manner that the beam diameter of laser light La gradually increases as it travels along the travelling direction (to weakly converge as compared to the case of collimating). The degree of the convergence of laser light La may be appropriately selected by selecting the power, aspherical surface coefficient, and the like of first lens surfaces 11, for example. When laser light La is weakly converged as compared with the case where laser light La is collimated at first lens surfaces 11, even when foreign matters are attached or damage is caused on second lens surfaces 12 described later (see FIG. 1), the area occupancy of the foreign matters or damage relative to the light spot on second lens surfaces 12 can be reduced. As a result, the influence of the foreign matters or damage on the coupling efficiency can be effectively reduced.

<Third Lens Surface>

While monitoring light Lm may be output from plate exterior surface 3a' through a plane region of plate exterior surface 3a', the present embodiment employs a configuration in which the light flux diameter and the emission direction of monitoring light Lm are appropriately controlled.

Specifically, as illustrated in FIG. 1 to FIG. 4, at positions above plate exterior surface 3a' and in the vicinity of the left end portion corresponding to light-receiving elements 14, third lens surfaces (convex lens surfaces) 13 each having a circular shape in plan view are formed. The number of third lens surfaces 13 is the same as that of light-receiving elements 14. Third lens surfaces 13 are aligned in a predetermined alignment direction corresponding to light-receiving elements 14, that is, in the direction same as the alignment direction of first lens surfaces 11. In addition, third lens surfaces 13 are formed in the same size at a pitch same as that of light-receiving elements 14. It is to be noted that third lens surfaces 13 adjacent to each other in the alignment direction may be in contact with each other at their circumferential end.

On each third lens surface 13 having the above-mentioned configuration, monitoring light Lm corresponding to the third lens surface 13 is incident from the inside of optical plate 3, as illustrated in FIG. 1. Third lens surfaces 13 converge monitoring light Lm corresponding to light emitting elements 10 incident on third lens surfaces 13, and output monitoring light Lm toward light-receiving elements 14 corresponding to third lens surfaces 13.

<Plate Internal Surface>

Further, upper surface 3b of optical plate 3 is disposed on the side opposite to photoelectric conversion device 7 with respect to plate exterior surface 3a' (upper side in FIG. 1).

Upper surface 3b serves as plate internal surface 3b through which laser light La from light emitting elements 10 incident on first lens surfaces 11 on plate exterior surface 3a' and monitoring light L to be output from third lens surfaces 13 on plate exterior surface 3a' pass.

<Optical Plate Fitting-Part>

In addition to optical elements 11, 13, and 3b disposed on the light path of optical plate 3, optical plate 3 is provided with a member that supports the mounting to optical block 4 is provided in optical plate 3.

Specifically, as illustrated in FIG. 1 to FIG. 5, a pair of protruding fitting pins 21 are provided on plate internal surface 3b along the depth direction in FIG. 1 (vertical direction in FIG. 3) at a predetermined interval. Fitting pins 21 serve as an optical plate fitting-part for fitting optical plate 3 and optical block 4 together. Fitting pins 21 are formed perpendicularly to plate internal surface 3b. In addition, as illustrated in FIG. 1 to FIG. 5, at the bottom end of each fitting pin 21, concentric annular flange part 22 is formed. Fitting pins 21 and flange parts 22 are each formed of a material same as that of optical plate 3, and are each formed integrally with optical plate 3.

In addition, fitting pin 21 and flange part 22 are disposed at a position shifted leftward from the position immediately above (just behind) first lens surface 11 in FIG. 1 and FIG. 3 so as to deviate from the light path of laser light La.

It is to be noted that the optical plate fitting-part is not limited to fitting pins 21. Examples the optical block-fitting part include a bottomed hole and a through hole.

[Details of Optical Block]

Next, details of optical block 4 are described. As illustrated in FIG. 1 and FIG. 6 to FIG. 9, optical block 4 includes optical block main body 17.

Optical block main body 17 has an external shape which is obtained by cutting a trapezoidal column out from a corner of a cuboid.

Specifically, as illustrated in FIG. 1 and FIG. 6 to FIG. 9, the external shape of optical block main body 17 is roughly composed of lower surface 17a, uppermost horizontal surface 17b, upper right tilted surface 17c, lowermost upper horizontal surface 17d, left surface 17e, right surface 17f, front surface 17g and rear surface 17h. Lower surface 17a, uppermost horizontal surface 17b and lowermost upper horizontal surface 17d are parallel to each other. Left and right surfaces 17e and 17f are parallel to each other, and front and rear surfaces 17g and 17h are parallel to each other. Further, lower surface 17a, uppermost horizontal surface 17b and lowermost upper horizontal surface 17d are perpendicular to each of front, rear, left and right surfaces 17e to 17h.

Optical block 4 having the above-mentioned configuration houses optical plate 3 in such a manner as to surround (shield) optical plate 3 from the upward (the side opposite to photoelectric conversion device 7) and from all lateral sides.

Specifically, as illustrated in FIG. 1 and FIG. 9, optical plate housing recess 18 which is recessed upward in FIG. 1 from lower surface 17a by a thickness of optical plate 3 added with the thickness of flange part 22 is provided at a center portion of lower surface 17a. Optical plate housing recess 18 has an internal periphery slightly greater than the external periphery of optical plate 3 and has a substantially rectangular shape in bottom view.

As illustrated in FIG. 1, when optical plate 3 is housed (mounted), the top surface of flange part 22 makes contact with internal bottom surface 18a of optical plate housing recess 18. In this state, as illustrated in FIG. 1, left internal surface 18b of optical plate housing recess 18 is separated from left surface 3c of optical plate 3 on the right side in FIG. 1 by a small gap. In this state, as illustrated in FIG. 1, right internal surface 18c of optical plate housing recess 18 is separated from right surface 3d of optical plate 3 on the left side in FIG. 1 by a small gap. Furthermore, in this state, front internal surface 18d of optical plate housing recess 18 may be separated from front surface 3e of optical plate 3 on the rear side by a small gap, and in addition, rear internal surface 18e of optical plate housing recess 18 may be separated from rear surface 3f of optical plate 3 on the front side by a small gap. In addition, in this state, as illustrated in FIG. 1, lower surface 17a of optical block main body 17 may be flush with peripheral portion 3a'' of optical plate 3.

<Plate-Facing Surface>

Internal bottom surface 18a of optical plate housing recess 18 of optical block main body 17 having the above-mentioned configuration serves as plate-facing surface 18a that is so disposed as to face plate internal surface 3b in parallel to plate internal surface 3b at a position near plate internal surface 3b.

<Incidence Surface>

A region corresponding to first lens surfaces 11 on plate-facing surface 18a having the above-mentioned configuration serves as incidence surface 19. On incidence surface 19, laser light La from light emitting elements 10 that has passed through plate internal surface 3b is incident from below in FIG. 1.

<Reflecting Surface>

As illustrated in FIG. 1, laser light La from light emitting elements 10 incident on incidence surface 19 travels upward in optical block main body 17.

Here, as can be seen in FIG. 1, above incidence surface 19 (that is, at the position opposite to incidence surface 19 in optical block main body 17), the above-described upper right tilted surface 17c is disposed.

As illustrated in FIG. 1, reflecting surface 23 is formed on upper right tilted surface 17c.

As illustrated in FIG. 1, reflecting surface 23 is a tilted surface that is tilted leftward toward the upper side, and has a predetermined tilted angle relative to incidence surface 19. The tilted angle may be 45 degrees clockwise from incidence surface 19 as the reference angle (0 degree) in FIG. 1.

On reflecting surface 23 having the above-mentioned configuration, laser light La from light emitting elements 10 incident on incidence surface 19 is incident (reaches) from below in FIG. 1, as illustrated in FIG. 1.

Then, reflecting surface 23 reflects laser light La emitted from light emitting elements 10 toward optical fiber 8, that is, the left side in FIG. 1.

Reflecting surface 23 having the above-mentioned configuration may be composed only of upper right tilted surface 17c, or may be formed by coating upper right tilted surface 17c with a reflection film made of Au, Ag, Al or the like. It is to be noted that, when reflecting surface 23 is composed only of upper right tilted surface 17c, the reflection of laser light La at reflecting surface 23 is total reflection. In this case, the incident angle of laser light La on reflecting surface 23 is an angle greater than a critical angle corresponding to the refractive index of optical block main body 17 for the wavelength of laser light La.

<Reflection-and-Transmission Layer Mounting Recess>

Reflection-and-transmission layer mounting recess 24 is disposed at a position on the left side in FIG. 1 and FIG. 7 toward which laser light La is reflected relative to reflecting surface 23 having the above-mentioned configuration. In vertical cross-section, reflection-and-transmission layer mounting recess 24 has a trapezoidal shape with legs perpendicular to the upper bottom and the lower bottom.

Reflection-and-transmission layer mounting recess 24 is provided in a recessed manner continuously with an optical fiber 8-side end portion of plate-facing surface 18a (left end in FIG. 1 and FIG. 7), in such a manner as to have an opening that is flush with plate-facing surface 18a and opens to plate internal surface 3b side.

To be more specific, as illustrated in FIG. 1 and FIG. 7, reflection-and-transmission layer mounting recess 24 is provided on lower surface 17a of optical block main body 17, in such a manner as to be further recessed from optical plate housing recess 18 at a portion on optical fiber 8 side (left side) having a predetermined range, and as to be in communication with optical plate housing recess 18.

In addition, as illustrated in FIG. 1 and FIG. 7, in reflection-and-transmission layer mounting recess 24, right internal surface 24a is formed perpendicularly to incidence surface 19, and left internal surface 24b (internal surface on optical fiber 8 side) is formed as a tilted surface that is tilted rightward toward the upper side and has a predetermined tilted angle relative to incidence surface 19. Left internal surface 24b serves as internal tilted surface 24b of reflection-and-transmission layer mounting recess 24. The tilted angle of internal tilted surface 24b may be 45 degrees counterclockwise from incidence surface 19 as the reference angle (0 degree) in FIG. 1.

As illustrated in FIG. 1, on reflection-and-transmission layer mounting recess 24 having the above-mentioned configuration, laser light La from light emitting elements 10 reflected by reflecting surface 23 is incident from right internal surface 24a.

Laser light La from light emitting elements 10 incident on reflection-and-transmission layer mounting recess 24 from right internal surface 24a is transmitted through reflection-and-transmission layer mounting recess 24 toward internal tilted surface 24b.

<Reflection-and-Transmission Layer>

On internal tilted surface 24b of the reflection-and-transmission layer mounting recess 24 having the above-mentioned configuration, reflection-and-transmission layer 20 having a small thickness is disposed as illustrated in FIG. 1.

Reflection-and-transmission layer 20 may be formed by coating internal tilted surface 24b with a single layer film formed of a metal such as Ni, Cr and Al, or a dielectric multilayer film which is obtained by alternately stacking a plurality of dielectrics (for example, $TiO_2$ and $SiO_2$) having dielectric constants different from each other. In this case, publicly known coating techniques such as inconel deposition may be adopted for the coating. With such coating, reflection-and-transmission layer 20 having a considerably small thickness of 1 μm or smaller can be formed, for example.

As illustrated in FIG. 1, on reflection-and-transmission layer 20 having the above-mentioned configuration, laser light La from light emitting elements 10 that has been transmitted through reflection-and-transmission layer mounting recess 24 is incident.

As illustrated in FIG. 1, reflection-and-transmission layer 20 reflects at a predetermined reflectance laser light La emitted from light emitting elements 10 as monitoring light Lm toward plate internal surface 3b (downward), and transmits at a predetermined transmittance laser light La toward optical fiber 8 (leftward) as fiber coupling light Lc to be coupled to optical fiber 8. At this time, since the thickness of reflection-and-transmission layer 20 is small, it is not necessary to take into account the refraction of laser light La which is transmitted through reflection-and-transmission layer 20 (the transmission can be taken as straight transmission).

It is to be noted that the reflectance and transmittance of reflection-and-transmission layer 20 may be set to any value according to the material, thickness and the like of reflection-and-transmission layer 20, as long as a sufficient amount of monitoring light Lm for monitoring the output of laser light La can be obtained. For example, when reflection-and-transmission layer 20 is composed of the above-described single layer film, reflection-and-transmission layer 20 may have a reflectance of 20%, and a transmittance of 60% (absorptance: 20%), although depending on its thickness. In addition, for example, when reflection-and-transmission layer 20 is composed of the above-described dielectric multilayer film, reflection-and-transmission layer 20 may have a reflectance of 10% and a transmittance of 90%, although depending on its thickness and number of the layers.

<Second Lens Surface>

Fiber coupling light Lc corresponding to light emitting elements 10 that has been transmitted through reflection-and-transmission layer 20 in the above-mentioned manner travels leftward in optical block main body 17, and then reaches a predetermined position on left surface 17e of optical block main body 17.

At the predetermined position where fiber coupling light Lc reaches, second lens surfaces 12 serving as the emission surface is disposed.

To be more specific, as illustrated in FIG. 1, FIG. 8 and FIG. 9, portion 17e' provided in a predetermined range of the center part and having a substantially rectangular shape in plan view is provided on left surface 17e in such a manner as to be recessed rightward in FIG. 1 with respect to peripheral portion 17e" that surrounds portion 17e'. Second lens surfaces 12 are provided on portion 17e' that is recessed in the above-mentioned manner.

As illustrated in FIG. 8, second lens surfaces 12 are each formed as a circular convex lens surface in plan view, and the number of second lens surfaces 12 is the same as that of first lens surfaces 11. In addition, second lens surfaces 12 are formed in such a manner as to be aligned in a direction same as the alignment direction of end surfaces 8a of optical fibers 8, that is, the alignment direction of first lens surfaces 11. Further, second lens surfaces 12 are formed in the same size and at a pitch same as that of first lens surfaces 11. It is also possible that second lens surfaces 12 adjacent to each other are formed in such a manner as to make contact with each other at their circumferential end in the alignment direction. Preferably, optical axis OA (2) of each second lens surface 12 is coaxial with the central axis of surface 8a of optical fiber 8 corresponding to the second lens surface 12. More preferably, optical axis OA (2) of each second lens surface 12 is perpendicular to left surface 17e.

On each second lens surface 12 having the above-mentioned configuration, fiber coupling light Lc corresponding to light emitting elements 10 is incident, as illustrated in FIG. 1. At this time, desirably, the central axis of fiber coupling light Lc corresponding to light emitting elements 10 matches optical axis OA (2) of each second lens surface 12.

Then, second lens surfaces 12 converge fiber coupling light Lc corresponding to light emitting elements 10 incident on second lens surfaces 12, and output fiber coupling light Lc toward end surfaces 8a of optical fibers 8 corresponding to second lens surfaces 12.

<Optical Block-Fitting Part>

In addition to the above-mentioned optical elements 19, 23, 20, and 12 disposed along the light path of optical block 4, optical block 4 is provided with a member that supports the mounting of optical plate 3.

Specifically, as illustrated in FIG. 1 and FIG. 6 to FIG. 9, at positions corresponding to the above-described pair of fitting pins 21 on plate-facing surface 18, a pair of recessed fitting holes 25 are provided as an optical block-fitting part. Fitting holes 25 are each configured to be fitted with fitting pin 21 and formed in a round hole. The internal diameter of each fitting hole 25 is slightly greater than the outer diameter of fitting pin 21. In addition, each fitting hole 25 is formed perpendicularly to plate-facing surface 18a.

It should be noted that the optical block-fitting part is not limited to fitting hole 25 and, for example, a fitting pin may be employed as the optical block-fitting part.

<Other Configurations of Optical Housing>

In addition to the above-mentioned components, optical block 4 is provided with a pair of fiber positioning pins 26 that perpendicularly project toward optical fiber 8 as illustrated in FIG. 1 and FIG. 6 to FIG. 9. Fiber positioning pins 26 are provided at positions on peripheral portion 17e" on left surface 17e of optical block main body 17 and on the outside in the alignment direction of second lens surfaces 12 relative to portion 17e' disposed at the center portion.

When optical fiber 8 is attached to lens array 2, fiber positioning pins 26 are inserted to a pair of fiber positioning holes not illustrated formed in connector 15, for the positioning of optical fiber 8. Desirably, the fiber positioning holes are round boss holes having the same size that satisfy the dimensional accuracy based on the standard of F12-type multicore optical fiber connectors (IEC 61754-5, JIS C 5981).

As illustrated in FIG. 9, at positions on lower surface 17a of optical block main body 17 and on the outside of optical plate housing recess 18, four hollow parts 28 each having a semi-lunar shape in bottom view are formed in communication with optical plate housing recess 18 and reflection-and-transmission layer mounting recess 24.

Hollow parts 28 serve as ports for injecting filler 5 or for removing bubbles at the time when filler 5 is provided between optical plate 3 and optical block 4 which are temporarily mounted by fitting fitting pin 21 and fitting hole 25 together.

[Details of Filler]

Next, details of filler 5 are described. As illustrated in FIG. 1, filler 5 is provided in reflection-and-transmission layer mounting recess 24, in such a manner as to completely fills the space between right internal surface 24a of reflection-and-transmission layer mounting recess 24 and reflection-and-transmission layer 20, and thus filler 5 forms a light path of laser light La of each light emitting element 10 in reflection-and-transmission layer mounting recess 24.

In addition, as illustrated in FIG. 1, filler 5 completely fills the space between plate internal surface 3b and incidence surface 19, and forms the light path of laser light La from light emitting elements 10 between plate internal surface 3b and incidence surface 19.

Further, as illustrated in FIG. 1, filler 5 fills the space between reflection-and-transmission layer mounting recess 24 and plate internal surface 3b, the space between plate internal surface 3b and plate-facing surface 18a other than incidence surface 19, and the spaces between front, rear, left and right surfaces 3c to 3f of optical plate 3 and internal surfaces 18b to 18e optical plate housing recess 18, respectively.

Furthermore, filler 5 is composed of an adhesive agent, and stably bonds optical plate 3 to the inside of optical block 4.

Filler 5 may be composed of a heat curable adhesive agent (in other words, thermosetting resin) or an ultraviolet ray-curable adhesive agent (in other words, ultraviolet ray-curable resin).

Desirably, when an ultraviolet ray-curable adhesive agent is employed, at least one of optical plate 3 and optical block main body 17 is formed of an ultraviolet ray-transmitting material (for example, a resin material such as polycarbonate). With this configuration, at the time of manufacturing lens array 2 (at the time of mounting optical plate 3 to optical block 4), ultraviolet ray can be efficiently applied from the outside of optical plate 3 or optical block 4 to the uncured ultraviolet ray-curable adhesive agent provided in advance through hollow part 28 in the space between optical plate 3 and optical block 4 which are temporarily mounted (temporarily fitted), and thus the ultraviolet ray-curable adhesive agent can be promptly cured.

[Refractive Indices of Optical Block, Filler, and Optical Plate]

In the present embodiment, the refractive indices of optical block main body 17 and filler 5 are selected in such a manner that the difference in refractive index between optical block main body 17 and filler 5 is equal to or smaller than a predetermined value. The predetermined value (refractive index difference) may be 0.01, for example. In this case, for example, optical block main body 17 may be formed using SD-1414 (polycarbonate; Teijin Chemicals Ltd.) by injection molding, and filler 5 may be a light path-connecting epoxy adhesive agent (ultraviolet ray type adhesive agent (ultraviolet-ray curable resin); NTT Advanced Technology Corporation). In this manner, optical block main body 17 having a refractive index (wavelength 850 nm) of 1.59 and filler 5 having a refractive index (wavelength 850 nm) of 1.59 can be obtained, and the refractive index difference therebetween can be set to a value equal to or smaller than 0.01.

With such a configuration, the refraction of fiber coupling light Lc incident on filler 5 and the refraction of fiber coupling light Lc incident on internal tilted surface 24b can be almost prevented.

As a result, regardless of the angles of right internal surface 24a and internal tilted surface 24b of reflection-and-transmission layer mounting recess 24, the light path of laser light La (Lc) that has passed through reflecting surface 23 can be provided along substantially the same line.

By selecting the refractive index in the above-mentioned manner, the light path can be readily provided. In addition, in the case where deviation of the coupling position of fiber coupling light Lc is found at end surface 8a of optical fiber 8 during the product test, the number of parts that require dimensional adjustment for eliminating the deviation can be reduced (for example, the deviation may be eliminated by only adjusting the angle of reflecting surface 23). This contributes to further facilitation of manufacturability.

In addition, in the present embodiment, the refractive index of optical plate 3 is selected such that the difference in refractive index between optical plate 3 and optical block main body 17 and the difference in refractive index between optical plate 3 and filler 5 are each equal to or lower than the above-described predetermined value (for example, 0.01). Optical plate 3 may be formed of the same material as that of optical block main body 17.

With such a configuration, Fresnel reflection on plate internal surface 3b and plate-facing surface 18a can be limited, and light use efficiency can be improved. In addition, as with the case of the light path of the light that has passed through coupling light incidence surface 23, it is desirable to ensure linearity of the light path between first lens surface 11 and reflecting surface 23. In the present embodiment, laser light La is incident on plate internal surface 3b and plate-facing surface 18a perpendicularly to plate internal surface 3b and plate-facing surface 18a, and thus linearity of the light path between first lens surface 11 and reflecting surface 23 can be ensured. Furthermore, by selecting the refractive index of optical plate 3 as in the present embodiment, the linearity can be stably ensured even when an error is caused in the perpendicular incidence.

[Main Operation and Effect of Lens Array and Optical Module]

With the above-mentioned configuration, laser light La from light emitting elements 10 incident on first lens surfaces 11 is sequentially transmitted through plate internal surface 3b, filler 5 and plate-facing surface 18a, and then reflected by through reflecting surface 23. Laser light L thus reflected is transmitted through filler 5 in reflection-and-transmission layer mounting recess 24, and thereafter separated by reflection-and-transmission layer 20 into second lens surface 12 side and third lens surface 13 side. Monitoring light Lm separated to third lens surface 13 side in the above-mentioned manner can be output to light-receiving element 14 side by third lens surfaces 13 after monitoring light Lm is sequentially passed through filler 5 and plate internal surface 3b. In addition, at this time, fiber coupling light Lc separated to second lens surface 12 side can be output by second lens surfaces 12 toward end face 8a of optical fiber 8 after fiber coupling light Lc is passed through the inside of optical block main body 17. In this manner, monitoring light Lm can be surely obtained while appropriately ensuring the light path of fiber coupling light Lc.

In addition, with the above-mentioned configuration, first lens surfaces 11 and third lens surfaces 13 are formed on optical plate 3 side, and second lens surfaces 12 are formed on optical block 4 side, and thus each of lens surfaces 11, 12 and 13 can be formed simply and highly accurately in comparison with the case where second lens surfaces 12 and first and third lens surfaces 11 and 13 which are formed on different surfaces are disposed on single lens array main body.

In particular, since optical plate 3 has a substantially flat plate shape, dimensional accuracy can be readily ensured, and the shape of the metal mold for injection molding can be simplified. Moreover, since the relative positional relationships among fitting pins 21 and lens surfaces 11 and 13 can be readily confirmed with the transparency (projection) from optical axis OA (1) direction, evaluation of the positional accuracy of fitting pins 21 and fine adjustment of the metal mold based on the evaluation can be easily performed as necessary.

Then, after simply and highly accurately forming lens surfaces 11, 12 and 13 and fitting pins 21, optical plate 3 and optical block 4 can be simply and highly accurately fitted to each other using fitting pins 21 and fitting holes 25. Thus, lens array 2 with sufficient dimensional accuracy can be readily manufactured.

It is to be noted that the present invention is not limited to the above-described embodiment, and can be implemented with various modifications in so far as they are within the scope of the appended claims or the equivalents thereof.

For example, in the above-described embodiment, lens array 2 is described as the optical receptacle, the number of each of lens surfaces 11, 12 and 13, optical fiber 8, light emitting element 10 and light-receiving element 14 may be one.

In addition, in the present invention, an optical transmission member such as light waveguide other than optical fiber 8 may be employed.

This application is entitled to and claims the benefit of Japanese Patent Application No. 2012-127927 filed on Jun. 5, 2012, the disclosure of which including the specification, drawings and abstract is incorporated herein by reference in its entirety.

INDUSTRIAL APPLICABILITY

The optical receptacle and the optical module according to the embodiment of the present invention are suitable for light communications using optical fibers, for example.

REFERENCE SIGNS LIST

1 Light module
2 Lens array
3 Optical plate

3a' Plate exterior surface
3b Plate internal surface
4 Optical block
5 Filler
7 Photoelectric conversion device
8 Optical fiber
10 Light emitting element
14 Light-receiving element
18a Plate-facing surface
19 Incidence surface
20 Reflection-and-transmission layer
21 Fitting pin
23 Reflecting surface
24 Reflection-and-transmission layer mounting recess
25 Fitting hole

The invention claimed is:

1. An optical receptacle that optically couples a light emitting element and an optical transmission member together when the optical receptacle is disposed between a photoelectric conversion device and the optical transmission member, the photoelectric conversion device including the light emitting element and a light-receiving element that receives monitoring light for monitoring light output from the light emitting element, the optical receptacle comprising:
an optical plate that is light transmissive and is so disposed as to face the photoelectric conversion device;
an optical block which is light transmissive and disposed on a side opposite to the photoelectric conversion device with respect to the optical plate; and
a filler which is light transmissive and provided between the optical block and the optical plate, wherein:
the optical plate includes:
a plate exterior surface on which light from the light emitting element is incident and from which the monitoring light is output toward the light-receiving element,
a plate internal surface disposed in parallel to the plate exterior surface on a side opposite to the photoelectric conversion device with respect to the plate exterior surface, the plate internal surface being a surface through which light of the light emitting element incident on the plate exterior surface and the monitoring light to be output from the plate exterior surface pass through, and
an optical plate fitting-part disposed on the plate internal surface, the optical plate fitting-part being configured to fit the optical plate and the optical block together,
the optical block includes:
a plate-facing surface disposed at a position near the plate internal surface, the plate-facing surface being so disposed as to face the plate internal surface,
an incidence surface disposed on the plate-facing surface, the incidence surface being a surface on which light of the light emitting element that passed through the plate internal surface is incident,
a reflecting surface disposed on a side opposite to the incidence surface at a tilted angle relative to the incidence surface, the reflecting surface being configured to receive light of the light emitting element incident on the incidence surface, and to reflect the light of the light emitting element thus received toward the optical transmission member,
a recess provided at a position on the optical transmission member side on the plate-facing surface in such a manner as to be recessed and to open to the plate internal surface side, the recess being a recess through which light of the light emitting element reflected by the reflecting surface passes,
a reflection-and-transmission layer that is formed as an internal surface of the recess on the optical transmission member side, and is disposed on an internal tilted surface of the recess, the internal tilted surface having a predetermined tilted angle relative to the incidence surface, the reflection-and-transmission layer being configured to receive light of the light emitting element that passed through the recess, and to reflect at a predetermined reflectance the light of the light emitting element thus received toward the plate internal surface as the monitoring light while transmitting the light of the light emitting element to the optical transmission member side at a predetermined transmittance as coupling light to be coupled to the optical transmission member,
an emission surface that receives the coupled light transmitted through the reflection-and-transmission layer, and outputs the coupled light thus received toward the optical transmission member, and
an optical block-fitting part disposed at a position corresponding to the optical plate fitting-part on the plate-facing surface, the optical block-fitting part being configured to be fitted with the optical plate fitting-part, and
the filler is provided at least in the recess, and between the recess and the plate internal surface.

2. The optical receptacle according to claim 1, wherein refractive indices of the optical block and the filler are selected such that a difference between the refractive indices is equal to or smaller than a predetermined value.

3. The optical receptacle according to claim 2, wherein
the filler is also provided between the incidence surface and the plate internal surface, and
a refractive index of the optical plate is selected such that differences in refractive index between the optical plate and the optical block and between the optical plate and the filler are each equal to or smaller than the predetermined value.

4. The optical receptacle according to claim 1, wherein
the filler is composed of an ultraviolet ray-curable adhesive agent, and
at least one of the optical plate and the optical block is formed of an ultraviolet ray-transmitting material.

5. The optical receptacle according to claim 1, wherein the reflecting surface is a total reflection surface on which light of the light emitting element is incident at an incident angle greater than a critical angle, and by which the light of the light emitting element incident on the total reflection surface is totally reflected toward the optical transmission member.

6. The optical receptacle according to claim 1, wherein
a first lens surface configured to input light of the light emitting element toward the reflecting surface is disposed at a position corresponding to the light emitting element on the plate exterior surface, and
the emission surface is a second lens surface.

7. The optical receptacle according to claim 6, wherein a third lens surface configured to output the monitoring light toward the light-receiving element is disposed at a position corresponding to the light-receiving element on the plate exterior surface.

8. An optical module comprising:
the optical receptacle and the photoelectric conversion device according to claim 1.

* * * * *